United States Patent
Bao

(10) Patent No.: US 12,452,632 B2
(45) Date of Patent: Oct. 21, 2025

(54) BEARER ESTABLISHMENT METHOD, CONFIGURATION METHOD, TERMINAL, AND NETWORK SIDE DEVICE

(71) Applicant: VIVO MOBILE COMMUNICATION CO., LTD., Dongguan (CN)

(72) Inventor: Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 622 days.

(21) Appl. No.: 17/866,832

(22) Filed: Jul. 18, 2022

(65) Prior Publication Data

US 2022/0353643 A1    Nov. 3, 2022

Related U.S. Application Data

(63) Continuation of application No. PCT/CN2021/072086, filed on Jan. 15, 2021.

(30) Foreign Application Priority Data

Jan. 22, 2020   (CN) .......................... 202010075718.2

(51) Int. Cl.
| | |
|---|---|
| *H04W 4/06* | (2009.01) |
| *H04W 76/10* | (2018.01) |
| *H04W 76/40* | (2018.01) |
| *H04W 80/02* | (2009.01) |

(52) U.S. Cl.
CPC .............. *H04W 4/06* (2013.01); *H04W 76/10* (2018.02); *H04W 76/40* (2018.02); *H04W 80/02* (2013.01)

(58) Field of Classification Search
CPC ....... H04W 4/06; H04W 76/10; H04W 80/02; H04W 76/40; H04W 76/11; H04W 76/12
See application file for complete search history.

(56) References Cited

U.S. PATENT DOCUMENTS

| | | | |
|---|---|---|---|
| 2005/0043050 A1* | 2/2005 | Lee ...................... | H04W 72/30 |
| | | | 455/515 |
| 2006/0256807 A1* | 11/2006 | Jung ..................... | H04W 72/30 |
| | | | 370/328 |

(Continued)

FOREIGN PATENT DOCUMENTS

| | | |
|---|---|---|
| CN | 101166306 A | 4/2008 |
| CN | 101426231 A | 5/2009 |

(Continued)

OTHER PUBLICATIONS

International Search Report issued in corresponding International Application No. PCT/CN2021/072086, mailed Apr. 7, 2021, 4 pages.

(Continued)

*Primary Examiner* — Michael K Phillips
(74) *Attorney, Agent, or Firm* — IPX PLLC

(57) ABSTRACT

A bearer establishment method, a configuration method, a terminal, and a network side device are provided. The bearer establishment method includes: receiving first information; and establishing, according to a first Layer 2 (L2) configuration parameter of a first Multicast Broadcast Service (MBS), a bearer corresponding to the first MBS, where the first L2 configuration parameter is determined based on the first information.

17 Claims, 3 Drawing Sheets

(56) References Cited

U.S. PATENT DOCUMENTS

| | | | | |
|---|---|---|---|---|
| 2009/0116418 | A1* | 5/2009 | Lee | H04W 72/30 370/312 |
| 2010/0058133 | A1* | 3/2010 | Lee | H04L 1/1854 370/312 |
| 2010/0080159 | A1 | 4/2010 | Hu et al. | |
| 2023/0027089 | A1* | 1/2023 | Pelletier | H04L 1/1812 |

FOREIGN PATENT DOCUMENTS

| | | | |
|---|---|---|---|
| CN | 101998275 | A | 3/2011 |
| CN | 109155902 | A | 1/2019 |
| CN | 109714794 | A | 5/2019 |
| CN | 110035398 | A | 7/2019 |
| CN | 110326313 | A | 10/2019 |
| CN | 110475210 | A | 11/2019 |
| KR | 20060115257 | A | 11/2006 |
| WO | 2016115669 | A1 | 7/2016 |
| WO | 2016119634 | A1 | 8/2016 |
| WO | 2019214733 | A1 | 11/2019 |

OTHER PUBLICATIONS

First Office Action issued in related Chinese Application No. 202010075718.2, mailed Dec. 3, 2021, 8 pages.

Office Action issued in related European Application No. 21744655.8, mailed Aug. 22, 2023, 12 pages.

Huawei et al: "MBS Session Management", 3GPP Draft; S2-2000489, Jan. 2020, 4 pages.

Office Action issued in related European Application No. 21744655.8, mailed Feb. 27, 2024, 14 pages.

The Extended European Search Report issued in related European Application No. 21744655.8, mailed Jan. 12, 2023, 9 pages.

Office Action issued in related Korean Application No. 10-2022-7028243, mailed Apr. 23, 2025, 13 pages.

3GPP TS 36.331 V15.8.0, Evolved Universal Terrestrial Radio Access (E-UTRA); Radio Resource Control (RRC); Protocol specification (Release 15), Dec. 2019, 947 pages.

LG Electronics, "New MBS architecture and procedures", SA WG2 Meeting #136AH, S2-2000350, Jan. 2020, 12 pages.

* cited by examiner

BEARER ESTABLISHMENT METHOD, CONFIGURATION METHOD, TERMINAL, AND NETWORK SIDE DEVICE

CROSS-REFERENCE TO RELATED APPLICATIONS

This application is a continuation of International Application No. PCT/CN2021/072086, filed on Jan. 15, 2021, which claims priority to Chinese Patent Application No. 202010075718.2, filed on Jan. 22, 2020. The entire contents of each of the above-referenced applications are expressly incorporated herein by reference.

TECHNICAL FIELD

Embodiments of the present disclosure relate to the field of communications technologies, and in particular, to a bearer establishment method, a configuration method, a terminal, and a network side device.

BACKGROUND

In a Long Term Evolution (LTE) mobile system, Layer 2 (L2) configuration parameters of bearers corresponding to all Multicast Broadcast Service (MBS) are configured in a default configuration manner. For example, a Packet Data Convergence Protocol (PDCP) entity is not included, a Radio Link Control (RLC) transmission mode is an Unacknowledged Mode (UM) by default, an RLC Sequence Number (SN) is 5 by default, a reordering timer is 0, and any Hybrid Automatic Repeat Request (HARQ) feedback, HARQ retransmission, or HARQ repetition retransmission is not supported.

It can be learned that currently, an existing manner of determining an L2 configuration parameter of a bearer corresponding to an MBS is single and has low flexibility.

SUMMARY

Embodiments of the present disclosure provide a bearer establishment method, a configuration method, a terminal, and a network side device.

The present disclosure is implemented as follows:

According to a first aspect, an embodiment of the present disclosure provides a bearer establishment method, where the method is applied to a terminal and includes:
  receiving first information; and
  establishing, according to a first layer 2 L2 configuration parameter of a first multicast/broadcast service MBS, a bearer corresponding to the first MBS, where the first L2 configuration parameter is determined based on the first information.

According to a second aspect, an embodiment of the present disclosure provides a configuration method, where the method is applied to a network side device and includes:
  sending first information, where the first information is used to determine a first L2 configuration parameter of a first MBS.

According to a third aspect, an embodiment of the present disclosure further provides a terminal, and the terminal includes:
  a receiving module, configured to receive first information; and
  an establishment module, configured to establish, according to a first L2 configuration parameter of a first MBS, a bearer corresponding to the first MBS, where the first L2 configuration parameter is determined based on the first information.

According to a fourth aspect, an embodiment of the present disclosure further provides a network side device, and the network side device includes:
  a sending module, configured to send first information, where the first information is used to determine a first L2 configuration parameter of a first MBS.

According to a fifth aspect, an embodiment of the present disclosure further provides a terminal. The terminal includes a processor, a memory, and a computer program that is stored in the memory and that can be run on the processor, and when the computer program is executed by the processor, the steps in the foregoing bearer establishment method are implemented.

According to a sixth aspect, an embodiment of the present disclosure further provides a network side device. The network side device includes a processor, a memory, and a computer program that is stored in the memory and that can be run on the processor, and when the computer program is executed by the processor, the steps of the foregoing configuration method are implemented.

According to a seventh aspect, an embodiment of the present disclosure further provides a computer-readable storage medium. The computer-readable storage medium stores a computer program, and when the computer program is executed by a processor, the steps of the foregoing bearer establishment method applied to the terminal are implemented, or the steps of the foregoing configuration method applied to the network side device are implemented.

In the embodiments of the present disclosure, the terminal may determine, based on the received first information, the L2 configuration parameter of the bearer corresponding to the first MBS. In this way, compared with the prior art in which L2 configuration parameters of MBS with different features are configured in a default configuration manner, in the embodiments of the present disclosure, flexibility of determining an L2 configuration parameter of an MBS can be improved, and further, flexibility of processing the MBS can be improved.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following descriptions show merely some embodiments of the present disclosure, and a person of ordinary skill in the art can obtain other accompanying drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The terms "first", "second", and the like in the embodiments of the present disclosure are intended to distinguish between similar subjects but do not necessarily describe a particular sequence or order. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
FIG. 1 is a structural diagram of a network system to which the embodiments of the present disclosure can be applied.

Referring to FIG. 1, FIG. 1 is a structural diagram of a network system to which the embodiments of the present disclosure can be applied. As shown in FIG. 1, the network system includes a terminal 11 and a network side device 12. Communication may be performed between the terminal 11 and the network side device 12.

In the embodiments of the present disclosure, the terminal 11 may also be referred to as User Equipment (UE). In actual application, the terminal 11 may be a mobile phone, a tablet personal computer, a laptop computer, a Personal Digital Assistant (PDA), a Mobile Internet Device (MID), a wearable device, an in-vehicle device, or the like. The network side device 12 may be a base station, a relay, an access point, or the like.

Figure 2:
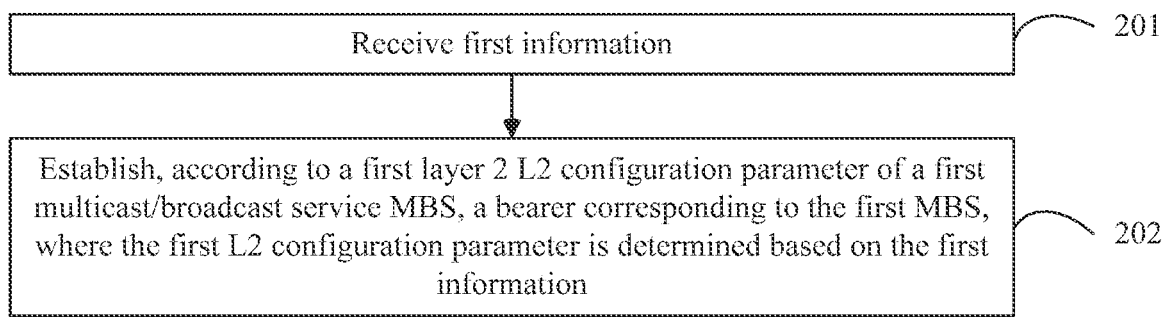
FIG. 2 is a flowchart of a bearer establishment method according to an embodiment of the present disclosure.

Referring to FIG. 2, FIG. 2 is a flowchart of a bearer establishment method according to an embodiment of the present disclosure. The bearer establishment method shown in FIG. 2 may be applied to a terminal.

As shown in FIG. 2, the bearer establishment method may include the following steps.

Step 201: Receive first information.

In this embodiment of the present disclosure, the first information is used to determine an L2 configuration parameter of a first MBS. However, it should be noted that in actual application, the first information may not carry the L2 configuration parameter of the first MBS, or may carry the L2 configuration parameter of the first MBS.

In exemplary implementation, the first information may be carried by using any one of the following: broadcast signaling, multicast signaling, unicast signaling, dedicated signaling, and system information.

For example, in case 1, the first information may be carried in a System Information Block (SIB) message.

In case 2, the first information may be carried in Radio Resource Control (RRC) signaling of a broadcast or multicast form. In some embodiments, the RRC signaling may be scheduled in the following manner: being scheduled by using a Physical Downlink Control Channel (PDCCH) scrambled by a multicast-specific Group-Radio Network Temporary Identifier (G-RNTI) or a multicast-specific G-RNTI corresponding to the first MBS.

In case 3, the first information may be carried by using UE-specific RRC signaling. In some embodiments, the RRC signaling may be scheduled in the following manner: being scheduled by using a PDCCH scrambled by a UE-specific Cell RNTI (C-RNTI) or a UE-specific G-RNTI.

Step 202: Establish, according to a first layer 2 L2 configuration parameter of a first multicast/broadcast service MBS, a bearer corresponding to the first MBS, where the first L2 configuration parameter is determined based on the first information.

After receiving the first information, the terminal determines the L2 configuration parameter of the first MBS according to the first information. In exemplary implementation, the L2 configuration parameter that is of the first MBS and that is determined according to the first information may include at least one of the following: a default L2 configuration parameter, and a specified L2 configuration parameter. The specified L2 configuration parameter may include at least one of the following: an L2 configuration parameter carried in the first information, and an L2 configuration parameter corresponding to the first information.

After determining the L2 configuration parameter of the first MBS, the terminal establishes, according to the determined L2 configuration parameter of the first MBS, the bearer corresponding to the first MBS, and may further perform service processing on the first MBS by using the bearer corresponding to the first MBS.

In this embodiment of the present disclosure, the first MBS may be any MBS of the terminal. It should be understood that, for a second L2 configuration parameter of a bearer corresponding to a second MBS of the terminal, in an implementation, the second L2 configuration parameter may be configured in a default configuration manner, that is, the second L2 configuration parameter is a default L2 configuration parameter. In another implementation, the second L2 configuration parameter may be determined in the manner of determining the first L2 configuration parameter, that is, the second L2 configuration parameter is determined based on received second information used to determine the second L2 configuration parameter. In other words, in this embodiment of the present disclosure, L2 configuration parameters of different MBSs of the terminal may be determined in a same manner or different manners. However, in this embodiment of the present disclosure, an L2 configuration parameter of at least one MBS of the terminal is determined based on information that is sent by another device such as a network side device and that is used to determine the L2 configuration parameter of the MBS. In actual application, a manner of determining an L2 configuration parameter of a bearer corresponding to each MBS may be determined based on a service requirement of each MBS, so that the bearer corresponding to each MBS can meet the service requirement of each MBS, thereby improving service processing reliability.

In actual application, a bearer corresponding to an MBS may be represented as a Multicast Radio Bearer (MRB) or a Dedicated Radio Bearer (DRB), but is not limited thereto.

According to the bearer establishment method in this embodiment, the terminal may determine, based on the received first information, the L2 configuration parameter of the bearer corresponding to the first MBS. In this way, compared with the prior art in which L2 configuration parameters of MBS with different features are configured in a default configuration manner, in the embodiments of the present disclosure, flexibility of determining an L2 configuration parameter of an MBS can be improved, and flexibility of processing the MBS can be improved.

In this embodiment of the present disclosure, the first information is:

MBS configuration information; or first signaling, where the first signaling corresponds to the first MBS or an MBS of a first type, and the MBS of the first type includes the first MBS.

The following describes the first information in different representations.

Representation 1: The first information is the MBS configuration parameter.

In exemplary implementation, in a first implementation, the MBS configuration information may be configuration information corresponding to the first MBS. In this implementation, the MBS configuration information is used to determine the L2 configuration parameter of the first MBS.

In a second implementation, the MBS configuration information may be configuration information corresponding to the MBS of the first type, and the MBS of the first type includes the first MBS. In this implementation, the MBS configuration information may be used to configure an L2 configuration parameter of the MBS of the first type, that is, the L2 configuration parameter of the MBS of the first type may be determined by using same MBS configuration information.

It can be learned that, compared with the first implementation in which L2 configuration parameters of different MBSs are determined by using different MBS configuration parameters, L2 configuration parameters of a plurality of MBSs may be determined by using one piece of MBS configuration information in the second implementation, so that signaling overheads can be reduced.

It should be noted that, in the first implementation, the MBS configuration information may carry identifier information of the first MBS. In this way, after receiving the MBS configuration information, the terminal may determine the L2 configuration information of the first MBS based on the MBS configuration information.

In the second implementation, in a first manner, the MBS configuration information may carry identifier information of each MBS included in the MBS of the first type; in a second manner, the MBS configuration information may carry identifier information of the MBS of the first type. In this way, after receiving the MBS configuration information, the terminal may determine L2 configuration information of the MBS of the first type based on the MBS configuration information.

It should be noted that in the first manner, the MBS configuration information carries a plurality of pieces of identifier information, and each piece of identifier information is used to identify one MBS. In the second manner, the MBS configuration information carries one piece of identifier information, and the identifier information is used to identify an MBS of one type.

In actual application, identifier information of an MBS may be a Temporary Mobile Group Identity (TMGI) of the MBS or another service identifier of the MBS.

In this embodiment of the present disclosure, the first L2 configuration parameter determined based on the first information in the representation 1 may meet any one of the following:

in a case that the first information does not carry an L2 configuration parameter, the first L2 configuration parameter is a default L2 configuration parameter; and in a case that the first information carries an L2 configuration parameter, the first L2 configuration parameter is determined according to at least the L2 configuration parameter carried in the first information.

In exemplary implementation, after receiving the first information, the terminal may detect whether the first information carries an L2 configuration parameter. Then, the L2 configuration parameter of the first MBS is determined according to a detection result. Exemplary descriptions are as follows:

Detection result 1: The first information does not carry an L2 configuration parameter.

In this case, the terminal may determine the default L2 configuration parameter as the first L2 configuration parameter, and establish, by using the default L2 configuration parameter, the bearer corresponding to the first MBS.

Detection result 2: The first information carries an L2 configuration parameter.

In this embodiment of the present disclosure, the L2 configuration parameter includes N configuration parameters, and N is a positive integer. If N is greater than 1, that the first information carries an L2 configuration parameter includes two cases.

In a first case, the first information carries all configuration parameters of an L2 configuration parameter.

In a second case, the first information carries only a first-part configuration parameter of an L2 configuration parameter, and does not carry a second-part configuration parameter of the L2 configuration parameter.

In the first case, that the first L2 configuration parameter is determined according to at least the L2 configuration parameter carried in the first information may be as follows: The first L2 configuration parameter is determined according to the L2 configuration parameter carried in the first information. For example, the terminal may determine the L2 configuration parameter carried in the first information as the first L2 configuration parameter, and establish, by using the L2 configuration parameter carried in the first information, the bearer corresponding to the first MBS.

In the second case, that the first L2 configuration parameter is determined according to at least the L2 configuration parameter carried in the first information may be as follows: The first L2 configuration parameter is determined according to the default L2 configuration parameter and the L2 configuration parameter carried in the first information. For example, a first-part configuration parameter of the first MBS is determined based on the first information, and a second-part configuration parameter of the first MBS is determined based on the default L2 configuration parameter. For ease of understanding, an example is described as follows:

It is assumed that an L2 configuration parameter includes a configuration parameter 1, a configuration parameter 2, and a configuration parameter 3. In addition, it is assumed that the first information carries the configuration parameter 1 and the configuration parameter 2 in the L2 configuration parameter. In this case, the terminal may determine the configuration parameter 1 and the configuration parameter 2 carried in the first information as a configuration parameter 1 and a configuration parameter 2 of the first MBS, determine a default configuration parameter 3 as a configuration parameter 3 of the first MBS, and establish, by using the configuration parameter 1 and the configuration parameter 2 carried in the first information and the default configuration parameter 3, the bearer corresponding to the first MBS.

In addition, in the detection result 2, for MBS configuration parameters in different implementations, a quantity of groups of L2 configuration parameters carried in the first information may be different. Exemplary descriptions are as follows:

It can be learned from the foregoing content that the MBS configuration information in the first implementation corresponds to the first MBS. Therefore, the MBS configuration information in the first implementation may carry only one group of L2 configuration parameters. In actual application, the MBS configuration information in the first implementation may carry the identifier information of the first MBS (for example, a TMGI of the first MBS) and one group of L2 configuration parameters.

The MBS configuration information in the second implementation corresponds to the MBS of the first type. Assuming that the MBS of the first type includes Q MBSs, and Q is an integer greater than 1, the MBS configuration information in the second implementation may include S groups of L2 configuration parameters, and S is a positive integer less than or equal to Q.

For ease of understanding, the following is described with reference to the foregoing first manner, that is, the MBS configuration information carries identifier information of Q MBSs.

If S is equal to 1, the MBS configuration information in the second implementation carries identifier information of Q MBSs and one group of L2 configuration parameters, and L2 configuration parameters of the Q MBSs are determined based on the L2 configuration parameters in the MBS configuration information.

If S is greater than 1 and is less than Q, the MBS configuration information in the second implementation carries identifier information of Q MBSs and S groups of L2 configuration parameters. Because S is less than Q, at least two MBSs in the Q MBSs correspond to a same group of configuration parameters, that is, L2 configuration parameters of at least two MBSs in the Q MBSs are determined based on a same group of configuration parameters.

For example, it is assumed that MBS configuration information includes a TMG1 1, a TMG 2, and a TMGI 3, and an L2 configuration parameter group 1 and an L2 configuration parameter group 2. The TMGI 1 and the TMGI 2 correspond to the L2 configuration parameter group 1, and the TMGI 3 corresponds to the L2 configuration parameter group 2. In addition, it is assumed that the TMGI 1 is used to identify an MBS 1, the TMGI 2 is used to identify an MBS 2, and the TMGI 3 is used to identify an MBS 3. In this way, after receiving the MBS configuration information, the terminal may determine L2 configuration parameters of the MBS 1 and the MBS 2 based on the L2 configuration parameter group 1, and determine an L2 configuration parameter of the MBS 3 based on the L2 configuration parameter group 2.

If S is equal to Q, the MBS configuration information in the second implementation carries identifier information of Q MBSs and Q groups of L2 configuration parameters, the identifier information of the MBSs that is carried in the MBS configuration information is in a one-to-one correspondence with the L2 configuration parameter groups, and an L2 configuration parameters of each MBS in the Q MBSs is determined based on the L2 configuration parameter that is corresponding to the MBS and that is carried in the MBS configuration information.

Representation 2: The first information is the first signaling, and the first signaling corresponds to the first MBS or the MBS of the first type.

The following describes a scenario 1 in which the first signaling corresponds to the first MBS and a scenario 2 in which the first signaling corresponds to the MBS of the first type.

In the scenario 1, signaling of different types or signaling of different formats may be used to determine L2 configuration parameters of different MBSs.

In some embodiments, the signaling type may include at least one of the following: dedicated signaling, multicast signaling, and broadcast signaling. The signaling format may include at least one of the following: a common MBS configuration, and a dedicated MBS configuration.

In the scenario 1, signaling may carry identifier information of an MBS corresponding to the signaling. In this way, after receiving the signaling, the terminal may determine, based on representation information of an MBS carried in the signaling, an MBS to which an L2 configuration parameter determined based on the signaling is applied.

For example, if L2 configuration parameters of different MB Ss are determined by using signaling of different types, assuming that multicast signaling corresponds to an MBS 1 and dedicated signaling corresponds to an MBS 2, the multicast signaling may carry identifier information of the MBS 1 and the dedicated signaling may carry identifier information of the MBS 2. In this way, if the terminal receives the multicast signaling, the terminal may determine an L2 configuration parameter of the MBS 1 by using the signaling. If the terminal receives the dedicated signaling, the terminal may determine an L2 configuration parameter of the MBS 2 by using the signaling.

If L2 configuration parameters of different MBSs are determined by using signaling of different formats, assuming that a signaling format 1 corresponds to an MBS 1 and a signaling format 2 corresponds to an MBS 2, signaling of the signaling format 1 may carry identifier information of the MBS 1 and signaling of the signaling format 2 may carry identifier information of the MBS 2. In this way, if the terminal receives the signaling of the signaling format 1, the terminal may determine an L2 configuration parameter of the MBS 1 by using the signaling. If the terminal receives the signaling of the signaling format 2, the terminal may determine an L2 configuration parameter of the MBS 2 by using the signaling.

In the scenario 2, signaling of different types or signaling of different formats may be used to determine L2 configuration parameters of MBSs of different types.

In exemplary implementation, signaling may carry identifier information of each MBS included in an MBS type corresponding to the signaling or identifier information of an MBS type corresponding to the signaling. In this way, after receiving the signaling, the terminal may determine, based on the identifier information carried in the signaling, an MBS to which an L2 configuration parameter determined based on the signaling is applied.

A difference between the scenario 1 and the scenario 2 mainly lies in that in the scenario 1, the first signaling may be used to determine only the L2 configuration information of the first MBS, and in the scenario 2, the first signaling may be used to determine L2 configuration information of each MBS included in the MBS of the first type. Implementation principles of the foregoing two cases are similar. Therefore, for implementation of the case corresponding to the first signaling and the case corresponding to the MBS of the first type, refer to the foregoing descriptions in the case corresponding to the first signaling and the case corresponding to the first MBS. Details are not described herein again.

In some embodiments, the first L2 configuration parameter determined based on the first information in the representation 2 may meet any one of the following:

the first L2 configuration parameter is a default L2 configuration parameter in a first condition; and the first L2 configuration parameter is determined according to at least the first information in a second condition, where the first condition includes: the first information is signaling of a first type, or the first information is signaling of a first format; and the second condition includes: the first information is signaling of a second type, or the first information is signaling of a second format.

For example, if signaling of different types is used to determine L2 configuration parameters of different MBSs, the first condition includes: the first information is the signaling of the first type, and the second condition includes: the first information is the signaling of the second type. If signaling of different formats is used to determine L2 configuration parameters of different MBSs, the first condition includes: the first information is the signaling of the first format, and the second condition includes: the first information is the signaling of the second format.

In the first condition, further, the signaling of the first type may be preset, or the signaling of the first format has a correspondence with the default L2 configuration parameter. In this way, if the terminal detects that the received first information is the signaling of the first type, or the first information is the signaling of the first format, the terminal may determine the default L2 configuration parameter as the L2 configuration parameter of the first MBS, and establish, by using the default L2 configuration parameter, the bearer corresponding to the first MBS. In this case, the first information may not carry an L2 configuration parameter, so that signaling overheads can be reduced. Certainly, in some implementations, the first information may also carry an L2 configuration parameter.

An example in which the first signaling corresponds to the first MBS is used for description. The first signaling of the first type may carry only the TMG 1 of the first MBS. After receiving the first signaling of the first type, the terminal may establish, by using the default L2 configuration parameter, the bearer corresponding to the first MBS.

In the second condition, in a first implementation, the first signaling may carry an L2 configuration parameter. In a second implementation, the first signaling may not carry an L2 configuration parameter. Exemplary descriptions are as follows:

In the first implementation, that the first L2 configuration parameter is determined according to at least the first information may be as follows: The first L2 configuration parameter is determined according to at least the L2 configuration parameter carried in the first information.

It should be noted that content of the first signaling in the case of "the first signaling carries an L2 configuration parameter" is the same as content of the MBS configuration information in the case of "the MBS configuration information carries an L2 configuration parameter". For details, refer to the foregoing descriptions. Details are not described herein again.

In addition, it can be learned from the foregoing content that a quantity of configuration parameters included in an L2 configuration parameter may be greater than 1. In this case, in actual application, an L2 configuration parameter group corresponding to the first MBS carried in the first information may include all configuration parameters of an L2 configuration parameter, or may include only a first-part configuration parameter of the L2 configuration parameter, and does not include a second-part configuration parameter. For the foregoing two possible cases, representation forms in which the first L2 configuration parameter is determined according to at least the first information are different. Exemplary descriptions are as follows:

If the L2 configuration parameter group corresponding to the first MB S carried in the first information includes all configuration parameters of an L2 configuration parameter, that the first L2 configuration parameter is determined according to at least the first information may be as follows: the first L2 configuration parameter is determined according to the L2 configuration parameter corresponding to the first MBS carried in the first information. For example, the terminal may determine the L2 configuration parameter corresponding to the first MBS carried in the first information as the L2 configuration parameter of the first MBS, and establish, by using the L2 configuration parameter corresponding to the first MBS carried in the first information, the bearer corresponding to the first MBS.

If the L2 configuration parameter group corresponding to the first MB S carried in the first information includes the first-part configuration parameter of the L2 configuration parameter and does not include the second-part configuration parameter of the L2 configuration parameter, that the first L2 configuration parameter is determined according to at least the first information may be as follows: the first L2 configuration parameter is determined according to the default L2 configuration parameter and the L2 configuration parameter corresponding to the first MBS carried in the first information. For example, the first-part configuration parameter of the first MB S is determined based on the L2 configuration information corresponding to the first MBS carried in the first information, and the second-part configuration parameter of the first MBS is determined based on the default L2 configuration parameter.

In the second implementation, the signaling of the second type may be preset, or the signaling of the second format has a correspondence with a group of L2 configuration parameters, and the group of L2 configuration parameters is not the default L2 configuration parameter. In this case, that the first L2 configuration parameter is determined according to at least the first information may be as follows: The first L2 configuration parameter is determined according to at least the L2 configuration parameter corresponding to the first information. In this way, if the terminal detects that the received first information is the signaling of the second type, or the first information is the signaling of the second format, the terminal may determine the group of L2 configuration parameters as the first L2 configuration parameter, and establish, by using the group of L2 configuration parameters, the bearer corresponding to the first MBS. In this case, the first information may not carry an L2 configuration parameter, so that signaling overheads can be reduced.

It should be noted that, in actual application, the network side device may determine the L2 configuration parameter of the first MBS based on the MBS configuration information and the first signaling. For example, a partial configuration parameter in the L2 configuration parameter of the first MBS is determined based on the MBS configuration information, and another partial configuration parameter in the L2 configuration parameter of the first MBS is determined based on the first signaling.

In this embodiment of the present disclosure, it can be learned from the foregoing content that, an application priority of the L2 configuration parameter carried in the first information may be higher than an application priority of the default L2 configuration parameter. For example, if a configuration parameter 3 carried in the first information indicates that a PDCP entity presents on the bearer corresponding to the first MBS, and a configuration parameter 3 in the default L2 configuration parameter indicates that no PDCP entity presents on the bearer corresponding to the MBS, the terminal preferentially establishes, according to the configuration parameter 3 carried in the first information, the bearer corresponding to the first MBS, and the PDCP entity presents on the established bearer corresponding to the first MBS.

In this embodiment of the present disclosure, the first L2 configuration parameter is used to indicate at least one of the following:
- whether a Service Data Adaptation Protocol (SDAP) entity presents on the bearer;
- a parameter of the SDAP entity on the bearer;
- whether a packet data convergence protocol PDCP entity presents on the bearer;
- a parameter of the PDCP entity on the bearer;
- a parameter of a radio link control RLC entity of the bearer; and
- a parameter of a Medium Access Control (MAC) entity of the bearer.

The following exemplarily describes the indication of the first L2 configuration parameter.

(1) The first L2 configuration parameter indicates whether the SDAP entity presents on the bearer.

In exemplary implementation, the first L2 configuration parameter may be used to indicate that the SDAP entity presents on the bearer; or the SDAP entity does not present on the bearer.

If the first L2 configuration parameter indicates that the SDAP entity presents on the bearer, an SDAP entity presents on the bearer corresponding to the first MBS established by the terminal. If the first L2 configuration parameter indicates that the SDAP entity does not present on the bearer, an SDAP entity does not present on the bearer corresponding to the first MBS established by the terminal.

In actual application, whether the SDAP entity presents on the bearer corresponding to the first MBS indicated by the L2 configuration information may be determined based on a service requirement of the first MBS.

The SDAP entity is mainly configured to perform mapping management from a Quality of Service (QoS) flow to a DRB, and carries mapping information, a QoS flow identifier (QFI), mapping reconfiguration feedback information, and the like. Therefore, if QoS mapping information needs to be carried in the first MBS, the SDAP entity may present on the bearer corresponding to the first MBS.

(2) The first L2 configuration parameter indicates the parameter of the SDAP entity of the bearer.

In this case, it is implicitly indicated that the SDAP entity presents on the bearer, and the SDAP entity may be configured based on at least the parameter that is of the SDAP entity of the bearer and that is indicated by the first L2 configuration parameter.

In actual application, the parameter that is of the SDAP entity of the bearer and that is indicated by the first L2 configuration parameter may include all parameters or some parameters of the SDAP entity.

If the parameter that is of the SDAP entity of the bearer and that is indicated by the first L2 configuration parameter includes all parameters of the SDAP entity, the SDAP entity of the bearer corresponding to the first MBS may be established by using the parameter that is of the SDAP entity of the bearer and that is indicated by the first L2 configuration parameter.

If the parameter that is of the SDAP entity of the bearer and that is indicated by the first L2 configuration parameter includes some parameters of the SDAP entity and does not include a second-part parameter of the SDAP entity, the SDAP entity of the bearer corresponding to the first MBS may be established by using a first-part parameter that is of the SDAP entity of the bearer and that are indicated by the first L2 configuration parameter and a second-part parameter of an SDAP entity in the default L2 configuration parameter.

(3) The first L2 configuration parameter indicates whether the PDCP entity presents on the bearer.

In exemplary implementation, the first L2 configuration parameter may be used to indicate that the PDCP entity presents on the bearer; or the PDCP entity does not present on the bearer.

If the first L2 configuration parameter indicates that the PDCP entity presents on the bearer, a PDCP entity presents on the bearer corresponding to the first MBS established by the terminal. If the first L2 configuration parameter indicates that the PDCP entity does not present on the bearer, a PDCP entity does not present on the bearer corresponding to the first MBS established by the terminal.

In actual application, whether the PDCP entity presents on the bearer corresponding to the first MBS indicated by the L2 configuration information may be determined based on a service requirement of the first MBS.

The PDCP entity is mainly used to carry security processing (functions such as encryption and integrity protection), PDCP SN maintenance, header compression processing, reordering, duplicate detection, and the like. Therefore, when functions such as reordering or duplicate detection are required for the first MBS, the PDCP entity may present on the bearer corresponding to the first MBS.

(4) The first L2 configuration parameter indicates the parameter of the PDCP entity of the bearer.

In this case, it is implicitly indicated that the PDCP entity presents on the bearer, and the PDCP entity may be configured based on at least the parameter that is of the PDCP entity of the bearer and that is indicated by the first L2 configuration parameter.

In actual application, the parameter that is of the PDCP entity of the bearer and that is indicated by the first L2 configuration parameter may include all parameters or some parameters of the PDCP entity.

If the parameter that is of the PDCP entity of the bearer and that is indicated by the first L2 configuration parameter includes all parameters of the PDCP entity, the PDCP entity of the bearer corresponding to the first MBS may be established by using the parameter that is of the PDCP entity of the bearer and that is indicated by the first L2 configuration parameter.

If the parameter that is of the PDCP entity of the bearer and that is indicated by the first L2 configuration parameter includes some parameters of the PDCP entity and does not include a second-part parameter of the PDCP entity, the PDCP entity of the bearer corresponding to the first MBS may be established by using a first-part parameter that is of the PDCP entity of the bearer and that are indicated by the first L2 configuration parameter and a second-part parameter of a PDCP entity in the default L2 configuration parameter.

(5) The first L2 configuration parameter indicates the parameter of the radio link control RLC entity of the bearer.

In actual application, the parameter that is of the RLC entity of the bearer and that is indicated by the first L2 configuration parameter may include all parameters or some parameters of the RLC entity.

If the parameter that is of the RLC entity of the bearer and that is indicated by the first L2 configuration parameter includes all parameters of the RLC entity, the RLC entity of the bearer corresponding to the first MBS may be established by using the parameter that is of the RLC entity of the bearer and that is indicated by the first L2 configuration parameter.

If the parameter that is of the RLC entity of the bearer and that is indicated by the first L2 configuration parameter includes some parameters of the RLC entity and does not include a second-part parameter of the RLC entity, the RLC entity of the bearer corresponding to the first MBS may be established by using a first-part parameter that is of the RLC entity of the bearer and that are indicated by the first L2 configuration parameter and a second-part parameter of an RLC entity in the default L2 configuration parameter.

(6) The first L2 configuration parameter indicates the parameter of the MAC entity of the bearer.

In actual application, the parameter that is of the MAC entity of the bearer and that is indicated by the first L2 configuration parameter may include all parameters or some parameters of the MAC entity.

If the parameter that is of the MAC entity of the bearer and that is indicated by the first L2 configuration parameter includes all parameters of the MAC entity, the MAC entity of the bearer corresponding to the first MBS may be established by using the parameter that is of the MAC entity of the bearer and that is indicated by the first L2 configuration parameter.

If the parameter that is of the MAC entity of the bearer and that is indicated by the first L2 configuration parameter includes some parameters of the MAC entity and does not include a second-part parameter of the MAC entity, the MAC entity of the bearer corresponding to the first MBS may be established by using a first-part parameter that is of the MAC entity of the bearer and that are indicated by the first L2 configuration parameter and a second-part parameter of a MAC entity in the default L2 configuration parameter.

In some embodiments, the first information is used to indicate at least one of the following:

a: whether an SDAP entity presents on the bearer;
b: first characteristic information of the first MBS, where there is a correspondence between the first characteristic information and whether an SDAP entity presents on the bearer;
c: a parameter of the SDAP entity on the bearer;
d: first identifier information, where there is a correspondence between the first identifier information and the parameter of the SDAP entity on the bearer;
e: second characteristic information of the first MBS, where there is a correspondence between the second characteristic information and the parameter of the SDAP entity on the bearer;
f: whether a PDCP entity presents on the bearer;
g: third characteristic information of the first MBS, where there is a correspondence between the third characteristic information and whether a PDCP entity presents on the bearer;
h: a parameter of the PDCP entity on the bearer;
i: second identifier information, where there is a correspondence between the second identifier information and the parameter of the PDCP entity on the bearer;
j: fourth characteristic information of the first MBS, where there is a correspondence between the fourth characteristic information and the parameter of the PDCP entity on the bearer;
k: a parameter of a radio link control RLC entity of the bearer;
l: third identifier information, where there is a correspondence between the third identifier information and the parameter of the RLC entity of the bearer;
m: fifth characteristic information of the first MBS, where there is a correspondence between the fifth characteristic information and the parameter of the RLC entity of the bearer;
n: a parameter of a medium access control MAC entity;
o: fourth identifier information, where there is a correspondence between the fourth identifier information and the parameter of the MAC entity of the bearer; and
p: sixth characteristic information corresponding to the first MBS, where there is a correspondence between the sixth characteristic information and the parameter of the MAC entity of the bearer.

The following describes the foregoing cases.

(1) The first information indicates a.

In this case, the first information indicates, in an explicit indication manner, whether the SDAP entity presents on the bearer. For example, if the first information indicates that the SDAP entity presents on the bearer, the SDAP entity presents on the bearer corresponding to the first MBS established by the terminal based on the first information. If the first information indicates that the SDAP entity does not present on the bearer, the SDAP entity does not present on the bearer corresponding to the first MBS established by the terminal based on the first information.

(2) The first information indicates b.

Because there is a correspondence between the first characteristic information and whether the SDAP entity presents on the bearer, the first information may implicitly indicate, by indicating the first characteristic information, whether the SDAP entity presents on the bearer.

For example, the first characteristic information includes at least a first presentation and a second presentation, where the first characteristic information in the first presentation corresponds to the case that the SDAP entity presents on the bearer, and the first characteristic information in the second presentation corresponds to the case that the SDAP entity does not present on the bearer. In this way, the terminal may determine, based on the representation of the first characteristic information indicated by the first information, whether the SDAP entity presents on the bearer corresponding to the first MBS.

For example, it is assumed that a service type of the first MBS indicated by the first characteristic information in the first presentation is a bidirectional task, and a service type of the first MBS indicated by the first characteristic information in the second presentation is a unidirectional task. If the first information indicates that the first MBS is a bidirectional task, the SDAP entity presents on the bearer corresponding to the first MBS established by the terminal based on the first information; or if the first information indicates that the first MBS is a unidirectional task, the SDAP entity does not present on the bearer corresponding to the first MBS established by the terminal based on the first information.

(3) The first information indicates c.

In this case, the first information explicitly indicates the parameter of the SDAP entity of the bearer.

(4) The first information indicates d.

Because there is a correspondence between the first identifier information and the parameter of the SDAP entity of the bearer, the first information may implicitly indicate the parameter of the SDAP entity of the bearer by indicating the first identifier information.

In exemplary implementation, the first identifier information may include Q representations, and Q is a positive integer. The first identifier information in each representation may correspond to a group of parameters of the SDAP entity, and the first identifier information in different representations corresponds to different parameter groups of the SDAP entity. In this way, the terminal may determine the parameter of the SDAP entity of the bearer based on a representation of the first identifier information indicated by the first information.

For example, the first identifier information in a representation 1 corresponds to a parameter group 1 of the SDAP entity, and the first identifier information in a representation 2 corresponds to a parameter group 2 of the SDAP entity. In this way, if the first identifier information indicated by the first information received by the terminal is the representation 1, the terminal may configure the SDAP entity of the first MBS by using the parameter group 1 of the SDAP entity.

(5) The first information indicates e.

Because there is a correspondence between the second characteristic information and the parameter of the SDAP entity of the bearer, the first information may implicitly indicate the parameter of the SDAP entity of the bearer by indicating the second characteristic information.

A difference between (4) and (5) is mainly as follows: In (4), the parameter of the SDAP entity of the bearer corresponds to identifier information, and may not be related to a characteristic of the first MBS, but in (5), the parameter of the SDAP entity of the bearer corresponds to the second characteristic information of the first MBS, and is related to a characteristic of the first MBS. Implementation principles of (4) and (5) are the same. Therefore, for implementation in (5), refer to the descriptions in (4). Details are not described herein again.

It should be noted that in actual application, in any one of the following cases, the SDAP entity may not present on the bearer corresponding to the first MBS established by the terminal. The first information does not indicate a to e, and the first information indicates, by using a or b, that the SDAP entity does not present on the bearer.

In addition, if the first information indicates, by using a or b, that the SDAP entity presents on the bearer, but the first information does not indicate c to e, the terminal may establish, by using the default L2 configuration parameter, the SDAP entity corresponding to the first MBS.

If the first information indicates one of c to e, the terminal may establish, by using the L2 configuration parameter indicated by the first information, the SDAP entity corresponding to the first MB S.

A main difference between the first information indicating f to j and the first information indicating a to e lies in that a to e indicated by the first information correspond to the SDAP entity of the bearer, and f to j indicated by the first information correspond to the PDCP entity of the bearer. Indication principles thereto are the same. Therefore, for details of the first information indicating f to j, refer to the descriptions of the first information indicating a to e. Details are not described herein again.

It should be noted that in actual application, in any one of the following cases, the PDCP entity may not present on the bearer corresponding to the first MBS established by the terminal. The first information does not indicate f to j, and the first information indicates, by using f or g, that the PDCP entity does not present on the bearer.

In addition, if the first information indicates, by using f or g, that the PDCP entity presents on the bearer, but the first information does not indicate h to j, the terminal may establish, by using the default L2 configuration parameter, the PDCP entity corresponding to the first MBS.

If the first information indicates one of h to j, the terminal may establish, by using the L2 configuration parameter indicated by the first information, the PDCP entity corresponding to the first MB S.

A main difference between the first information indicating k to m and the first information indicating c to e lies in that c to e indicated by the first information correspond to the SDAP entity of the bearer, and k to m indicated by the first information correspond to the RLC entity of the bearer. Indication principles thereto are the same. Therefore, for details of the first information indicating k to m, refer to the descriptions of the first information indicating c to e. Details are not described herein again.

It should be noted that in actual application, if the first information indicates one of k to m, the terminal may establish, by using the L2 configuration parameter indicated by the first information, the RLC entity corresponding to the first MBS. If the first information does not indicate k to m, the terminal may establish, by using the default L2 configuration parameter, the RLC entity corresponding to the first MBS.

A main difference between the first information indicating n to p and the first information indicating c to e lies in that c to e indicated by the first information correspond to the SDAP entity of the bearer, and n to p indicated by the first information correspond to the MAC entity of the bearer. Indication principles thereto are the same. Therefore, for details of the first information indicating n to p, refer to the descriptions of the first information indicating c to e. Details are not described herein again.

It should be noted that in actual application, if the first information indicates one of n to p, the terminal may establish, by using the L2 configuration parameter indicated by the first information, the RLC entity corresponding to the first MBS. If the first information does not indicate n to p, the terminal may establish, by using the default L2 configuration parameter, the RLC entity corresponding to the first MBS.

Figure 3:
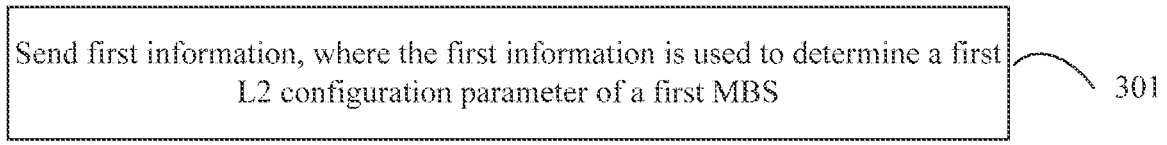
FIG. 3 is a flowchart of a configuration method according to an embodiment of the present disclosure.

Referring to FIG. 3, FIG. 3 is a flowchart of a configuration method according to an embodiment of the present disclosure. The configuration method corresponding to FIG. 3 may be applied to a network side device.

As shown in FIG. 3, the configuration method may include the following steps.

Step 301: Send first information, where the first information is used to determine a first L2 configuration parameter of a first MBS.

In the configuration method in this embodiment, a terminal may determine an L2 configuration parameter of an MBS by using the first information, thereby enriching a manner of determining the L2 configuration parameter of the MBS.

In some embodiments, the first information is:
MBS configuration information; or
first signaling, where the first signaling corresponds to the first MBS or an MBS of a first type, and the MBS of the first type includes the first MBS.

In some embodiments, in a case that the first information is the MBS configuration information, the first L2 configuration parameter meets any one of the following:
in a case that the first information does not carry an L2 configuration parameter, the first L2 configuration parameter is a default L2 configuration parameter; and
in a case that the first information carries an L2 configuration parameter, the first L2 configuration parameter is determined according to at least the L2 configuration parameter carried in the first information.

In some embodiments, in a case that the first information is the first signaling, the first L2 configuration parameter meets any one of the following:
the first L2 configuration parameter is a default L2 configuration parameter in a first condition; and
the first L2 configuration parameter is determined according to at least the first information in a second condition, where
the first condition includes: the first information is signaling of a first type, or the first information is signaling of a first format; and the second condition includes: the first information is signaling of a second type, or the first information is signaling of a second format.

In some embodiments, the first information may be carried by using any one of the following: broadcast signaling, multicast signaling, unicast signaling, dedicated signaling, and system information.

In some embodiments, the first L2 configuration parameter is used to indicate at least one of the following:
whether a service data adaptation protocol SDAP entity presents on the bearer;
a parameter of the SDAP entity on the bearer;
whether a packet data convergence protocol PDCP entity presents on the bearer;
a parameter of the PDCP entity on the bearer;
a parameter of a radio link control RLC entity of the bearer; and
a parameter of a medium access control MAC entity of the bearer.

In some embodiments, the first information is used to indicate at least one of the following:
whether an SDAP entity presents on the bearer;
first characteristic information of the first MBS, where there is a correspondence between the first characteristic information and whether an SDAP entity presents on the bearer;
a parameter of the SDAP entity on the bearer;
first identifier information, where there is a correspondence between the first identifier information and the parameter of the SDAP entity on the bearer;
second characteristic information of the first MBS, where there is a correspondence between the second characteristic information and the parameter of the SDAP entity on the bearer;
whether a PDCP entity presents on the bearer;
third characteristic information of the first MBS, where there is a correspondence between the third characteristic information and whether a PDCP entity presents on the bearer;
a parameter of the PDCP entity on the bearer;
second identifier information, where there is a correspondence between the second identifier information and the parameter of the PDCP entity on the bearer;
fourth characteristic information of the first MBS, where there is a correspondence between the fourth characteristic information and the parameter of the PDCP entity on the bearer;
a parameter of a radio link control RLC entity of the bearer;
third identifier information, where there is a correspondence between the third identifier information and the parameter of the RLC entity of the bearer;
fifth characteristic information of the first MBS, where there is a correspondence between the fifth characteristic information and the parameter of the RLC entity of the bearer;
a parameter of a medium access control MAC entity;
fourth identifier information, where there is a correspondence between the fourth identifier information and the parameter of the MAC entity of the bearer; and
sixth characteristic information corresponding to the first MBS, where there is a correspondence between the sixth characteristic information and the parameter of the MAC entity of the bearer.

It should be noted that this embodiment is used as an implementation of the network side device corresponding to the foregoing method embodiment. Therefore, reference may be made to the related descriptions in the foregoing method embodiment. To avoid repeated descriptions, details are not described herein again.

The plurality of optional implementations described in this embodiment of the present disclosure may be implemented in combination with each other, or may be separately implemented. This is not limited in this embodiment of the present disclosure.

For ease of understanding, an example is described as follows:

To introduce different L2 configurations for different broadcast/multicast services and consider the requirement of reducing signaling overheads as much as possible, an L2 configuration parameter of a broadcast/multicast service may be configured in the following manner:

In one manner, when configuration information corresponding to a service does not carry any L2 configuration parameter, UE establishes a corresponding MRB for the service by using a default L2 configuration parameter; when configuration information corresponding to a service explicitly carries an L2 configuration parameter, UE establishes a corresponding MRB for the service according to the carried L2 configuration parameter; when configuration information corresponding to a service explicitly carries a part of an L2 configuration parameter, UE establishes a corresponding MRB for the service according to (the carried part of L2 configuration parameter and a default value of the remaining L2 parameter).

In another manner, different signaling or signaling manners are used to carry broadcast/multicast services of different types and corresponding L2 configuration parameters. For example, a network carries broadcast/multicast service information of a default parameter by using broadcast or multicast signaling, and carries broadcast/multicast service information for which an L2 parameter needs to be specially configured and corresponding configuration parameters by using dedicated signaling; or a network carries broadcast/multicast service information of a default parameter in a signaling format 1, and carries broadcast/multicast service information for which an L2 parameter needs to be configured and a corresponding configuration in a signaling format 2. Both the signaling format 1 and the signaling format 2 may be sent in a broadcast/multicast form, and the signaling format 2 may also be sent in a unicast form.

In actual application, the foregoing two manners may also be combined.

A layer 2 parameter that may be configured may include one or a combination of the following:
whether an SDAP entity presents;
a configuration parameter of the SDAP entity;
whether a PDCP entity presents;

a configuration parameter of the PDCP entity;
a configuration parameter of an RLC entity; and
a MAC HARQ feedback and a repetition transmission configuration parameter.

Embodiment 1: Configuration of Whether an L2 Entity Presents

For a unicast NR service, configuration information of an SDAP entity and a PDCP entity needs to be carried when a DRB is established. The SDAP entity is mainly configured to perform mapping management from a QoS flow to a DRB, and carries mapping information, a QFI, mapping reconfiguration feedback information, and the like. The PDCP entity is mainly configured to carry security processing (functions such as encryption and integrity protection), PDCP SN maintenance, header compression processing, reordering, duplicate detection, and the like.

However, a broadcast/multicast service is only used for downlink transmission, only a downlink bearer from a QoS flow to an MRB is required, and a gNB is implemented. The UE may not need to participate, and generally, a security operation (functions such as encryption and integrity protection) does not need to be started, and a header compression mechanism is not required. Therefore, for a general broadcast/multicast service, an SDAP entity and a PDCP entity may be omitted on an MRB of the multicast/broadcast service. However, for some special services, for example, QoS mapping information needs to be carried, and an SDAP entity function and an SDAP entity parameter may need to be configured or when functions such as reordering/duplicate detection are required, a PDCP entity and a PDCP entity parameter may need to be configured.

For example, when an SDAP entity and an SDAP parameter are not required for an MBS, the UE may be notified in the following manners:

MBS service information is configured by using an SIB message and does not carry any SDAP entity indication or SDAP parameter. The UE receives the service configuration, and establishes an MRB for which a protocol stack architecture of an SDAP entity is not required by default, to receive the MBS service.

RRC signaling of a broadcast or multicast form is scheduled by using, for example, a PDCCH scrambled by a multicast-specific G-RNTI or a multicast-specific G-RNTI corresponding to the service, and the RRC signaling does not carry any SDAP entity indication or SDAP parameter. The UE receives the service configuration, and establishes an MRB for which a protocol stack architecture of an SDAP entity is not required by default, to receive the MBS service.

UE-specific RRC signaling is scheduled by using, for example, a PDCCH scrambled by a UE-specific connected C-RNTI or a UE-specific G-RNTI, and the RRC signaling does not carry any SDAP entity indication or SDAP parameter. The UE receives the service configuration, and establishes an MRB for which a protocol stack architecture of an SDAP entity is not required by default, to receive the MBS service.

When an SDAP entity and an SDAP parameter are required for an MBS, the UE may be notified in the following manners:

MBS service information is configured by using an SIB message and needs to carry an SDAP entity presentation indication or SDAP parameter. The UE receives the service configuration, and establishes an MRB with a protocol stack architecture of a corresponding SDAP entity according to a configured and/or default parameter, to receive the MBS service.

RRC signaling of a broadcast or multicast form is scheduled by using, for example, a PDCCH scrambled by a multicast-specific G-RNTI or a multicast-specific G-RNTI corresponding to the service, and the RRC signaling needs to carry an SDAP entity presentation indication or SDAP parameter. The UE receives the service configuration, and establishes an MRB with a protocol stack architecture of a corresponding SDAP entity according to a configured and/or default parameter, to receive the MBS service.

UE-specific RRC signaling is scheduled by using, for example, a PDCCH scrambled by a UE-specific connected C-RNTI or a UE-specific G-RNTI, and the RRC signaling needs to carry an SDAP entity presentation indication or SDAP parameter. The UE receives the service configuration, and establishes an MRB with a protocol stack architecture of a corresponding SDAP entity according to a configured and/or default parameter, to receive the MBS service.

The SDAP entity presentation indication may present separately. When the indication presents separately, an SDAP entity protocol layer in an MRB is included, and an SDAP is configured according to a standard default parameter. The SDAP entity indication may also present implicitly, that is, no explicit field indicates whether the SDAP entity presents, but binds whether the SDAP entity presents to another field. For example, when a bidirectional service is indicated, the SDAP entity protocol layer in the MRB is included, and the SDAP is configured according to a standard default parameter. For example, the SDAP supports a 6-bit QFI, supports/does not support a 1-bit Reflective QoS flow to DRB mapping Indication (RDI), supports/does not support a 1-bit Reflective QoS Indication (RQI), and the like.

For example, when a PDCP entity and a PDCP parameter are not required for an MBS, the UE may be notified in the following manners:

MBS service information is configured by using an SIB message and does not carry any PDCP entity indication or PDCP parameter. The UE receives the service configuration, and establishes an MRB for which a protocol stack architecture of a PDCP entity is not required by default, to receive the MBS service.

RRC signaling in a broadcast or multicast form is scheduled by using, for example, a PDCCH scrambled by a multicast-specific G-RNTI or a multicast-specific G-RNTI corresponding to the service, and the RRC signaling does not carry any PDCP entity indication or PDCP parameter. The UE receives the service configuration, and establishes an MRB for which a protocol stack architecture of a PDCP entity is not required by default, to receive the MBS service.

UE-specific RRC signaling is scheduled by using, for example, a PDCCH scrambled by a UE-specific connected C-RNTI or a UE-specific G-RNTI, and the RRC signaling does not carry any PDCP entity indication or PDCP parameter. The UE receives the service configuration, and establishes an MRB for which a protocol stack architecture of a PDCP entity is not required by default, to receive the MBS service.

When a PDCP entity and a PDCP parameter are required for an MBS, the UE may be notified in the following manners:

MBS service information is configured by using an SIB message and needs to carry a PDCP entity presentation indication or PDCP parameter (for example, a header compression configuration, a security configuration, a reordering timer configuration, or a PDCP SN size). The UE receives the service configuration, and establishes an MRB with a protocol stack architecture of a corresponding PDCP entity according to a configured and/or default parameter, to receive the MBS service.

RRC signaling in a broadcast or multicast form is scheduled by using, for example, a PDCCH scrambled by a multicast-specific G-RNTI or a multicast-specific G-RNTI corresponding to the service, and the RRC signaling needs to carry a PDCP entity presentation indication or PDCP parameter. The UE receives the service configuration, and establishes an MRB with a protocol stack architecture of a corresponding PDCP entity according to a configuration parameter or a default parameter, to receive the MBS service.

UE-specific RRC signaling is scheduled by using, for example, a PDCCH scrambled by a UE-specific connected C-RNTI or a UE-specific G-RNTI, and the RRC signaling needs to carry a PDCP entity presentation indication or PDCP parameter. The UE receives the service configuration, and establishes an MRB with a protocol stack architecture of a corresponding PDCP entity according to a configuration parameter or a default parameter, to receive the MBS service.

The PDCP entity presentation indication may present separately. When the indication presents separately, a PDCP entity protocol layer in an MRB is included, and a PDCP is configured according to a standard default parameter. The PDCP entity indication may also present implicitly, that is, no explicit field indicates whether the PDCP entity presents, but binds whether the PDCP entity presents to another field. For example, when a service that requires a HARQ feedback is indicated, the PDCP entity protocol layer in the MRB is included, and the PDCP is configured according to a standard default parameter. The default PDCP parameter may be: RLC UM is supported, a PDCP SN length is 12 or 18, security is not supported, header compression is not supported, a reordering timer length is T, and the like.

Embodiment 2: Configuration of an RLC Parameter

In an NR unicast service, configuration of an RLC parameter is required, including an RLC transmission mode, an RLC SN length, a reassembly timer length, and a related parameter of an AM status feedback.

In a broadcast/multicast services, the RLC parameter varies. For example, for an LTE single-cell multicast service, because any multi-transmission and HARQ feedback/HARQ retransmission are not supported, a simple default parameter is used as the RLC parameter: An RLC transmission mode is UM, an RLC SN length is 5 bits, and a reordering timer is 0.

In an NR multicast/broadcast transmission, to support more service types, a feedback and retransmission mechanism needs to be introduced. Therefore, a same default RLC parameter cannot be used for all services. Different RLC parameters need to be configured for different services.

For example, when an MBS does not need to perform feedback or retransmission, corresponding RLC configuration may be notified to the UE in the following manner:

MBS service information is configured by using an SIB message and does not carry any RLC entity indication or RLC parameter The UE receives the service configuration, and establishes an MRB according to a default RLC parameter (for example, the RLC transmission mode is UM, the RLC SN length is 6 bits, and the reassembly timer is 0), to receive the MBS service.

RRC signaling of a broadcast or multicast form is scheduled by using, for example, a PDCCH scrambled by a multicast-specific G-RNTI or a multicast-specific G-RNTI corresponding to the service, and the RRC signaling does not carry any RLC entity indication or RLC parameter. The UE receives the service configuration, and establishes an MRB according to a default RLC parameter (for example, the RLC transmission mode is UM, the RLC SN length is 6 bits, and the reassembly timer is 0), to receive the MBS service.

UE-specific RRC signaling is scheduled by using, for example, a PDCCH scrambled by a UE-specific connected C-RNTI or a UE-specific G-RNTI, and the RRC signaling does not carry any RLC entity indication or RLC parameter. The UE receives the service configuration, and establishes an MRB according to a default RLC parameter (for example, the RLC transmission mode is UM, the RLC SN length is 6 bits, and the reassembly timer is 0), to receive the MBS service.

When the MBS needs a special (for example, a non-default value) RLC parameter, the UE may be notified in the following manners:

MBS service information needs to be configured by using an SIB message, and needs to carry an RLC parameter (for example, an RLC SN size, an RLC reassembly timer length, and even may include an RLC mode, a feedback configuration parameter required by an RLC AM). The UE receives the service configuration, and establishes an MRB according to a configured RLC parameter, to receive the MBS service.

RRC signaling of a broadcast or multicast form is scheduled by using, for example, a PDCCH scrambled by a multicast-specific G-RNTI or a multicast-specific G-RNTI corresponding to the service, and the RRC signaling needs to carry an RLC parameter (for example, an RLC SN size, an RLC reassembly timer length, and even may include an RLC mode, a feedback configuration parameter required by an RLC AM). The UE receives the service configuration, and establishes an MRB according to a configured RLC parameter, to receive the MBS service.

UE-specific RRC signaling is scheduled by using, for example, a PDCCH scrambled by a UE-specific connected C-RNTI or a UE-specific G-RNTI, and the RRC signaling needs to carry an RLC parameter (for example, an RLC SN size, an RLC reassembly timer length, and even may include an RLC mode, a feedback configuration parameter required by an RLC AM). The UE receives the service configuration, and establishes an MRB according to a configured RLC parameter, to receive the MBS service.

An RLC parameter may explicitly present. When an RLC parameter explicitly presents, an RLC parameter corresponding to a newly established MRB is set according to an explicit parameter value. For another parameter that is not explicitly configured, a default value is used. The RLC parameter configuration may also present implicitly, that is, no explicit field indicates a specific RLC parameter. However, a group of RLC parameters is to be used for binding to another field. For example, when a service that requires a HARQ feedback is indicated, another group of default RLC parameter values is taken from the RLC parameter configuration in the MRB. Another group of default RLC parameters may be RLC UM, an RLC SN length 6 or 12, and a reassembly timer length T2 (T2 is not equal to 0), and the value is specified in a protocol or the value is preconfigured.

Embodiment 3: Configuration of a MAC Parameter

In LTE, only a single service type is supported, a transmission block error rate requirement is not high, and a MAC layer does not support multi-transmission, HARQ feedback/ HARQ retransmission, or the like. Therefore, MAC-related configuration does not include this part of content.

In NR, to further support high-reliability service transmission, the MAC layer needs to support one or a combination of the following functions:

a transmit end performs multi-transmission independently;

a receive end needs to feed back a HARQ feedback;

the receive end feeds back a HARQ negative acknowledgement (NACK) when receiving fails;

the receive end feeds back a HARQ ACK when receiving succeeds, and feeds back a HARQ NACK when receiving fails;

location information of the HARQ feedback; and a HARQ maximum transmission quantity.

For example, when an MBS does not need to perform feedback or retransmission, corresponding MAC configuration may be notified to the UE in the following manner:

MBS service information is configured by using an SIB message, and does not carry any MAC feedback or retransmission parameter. The UE receives the service configuration, and establishes an MRB according to a default MAC parameter (for example, MAC only supports single transmission), to receive the MBS service; or RRC signaling of a broadcast or multicast form is scheduled by using, for example, a PDCCH scrambled by a multicast-specific G-RNTI or a multicast-specific G-RNTI corresponding to the service, and the RRC signaling does not carry any MAC feedback or retransmission parameter. The UE receives the service configuration, and establishes an MRB, to receive the MBS service according to a default MAC parameter (for example, MAC only supports single transmission).

UE-specific RRC signaling is scheduled by using, for example, a PDCCH scrambled by a UE-specific connected C-RNTI or a UE-specific G-RNTI, and the RRC signaling does not carry any MAC feedback or retransmission parameter. The UE receives the service configuration, and establishes an MRB, to receive the MBS service according to a default MAC parameter (for example, MAC only supports single transmission).

When a MAC retransmission and/or feedback parameter are required for an MBS, the UE may be notified in the following manners:

MBS service information is configured by using an SIB message and needs to carry a MAC parameter (for example, a MAC retransmission type, a HARQ feedback type, and a retransmission quantity). The UE receives the service configuration, and establishes an MRB, to receive the MBS service according to a configured MAC parameter.

RRC signaling of a broadcast or multicast form is scheduled by using, for example, a PDCCH scrambled by a multicast-specific G-RNTI or a multicast-specific G-RNTI corresponding to the service, and the RRC signaling needs to carry a MAC parameter (for example, a MAC retransmission type, a HARQ feedback type, and a retransmission quantity). The UE receives the service configuration, and establishes an MRB, to receive the MBS service according to a configured MAC parameter.

UE-specific RRC signaling is scheduled by using, for example, a PDCCH scrambled by a UE-specific connected C-RNTI or a UE-specific G-RNTI, and the RRC signaling needs to carry a MAC parameter (for example, a MAC retransmission type, a HARQ feedback type, and a retransmission quantity). The UE receives the service configuration, and establishes an MRB, to receive the MBS service according to a configured MAC parameter.

Configuration related to transmission at the MAC layer may include N groups of default parameters. When no transmission parameter information is carried, the configuration at the MAC layer is executed according to a default transmission parameter set 0; and when a transmission parameter indication 1 is carried, the configuration at the MAC layer is executed according to a default transmission parameter set 1. By analogy, when a transmission parameter indication N is carried, the configuration at the MAC layer is executed according to a default transmission parameter set N.

In this embodiment of the present disclosure, a related layer 2 parameter is configured for a broadcast-multicast service in a plurality of signaling manners, so that the UE can obtain different multicast bearer configurations according to a feature of a received service, NR multicast-multicast transmission can and more flexibly support various service transmission requirements, thereby improving universality of multicast service application and QoS guarantee of a Uu interface for a multicast service, and further improving system efficiency and flexibility by considering small overheads and easy expansion in a signaling design.

Figure 4:
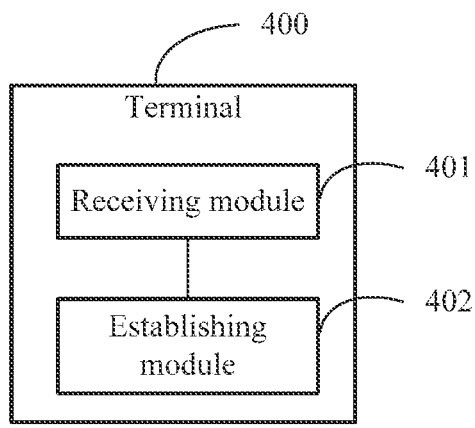
FIG. 4 is a first structural diagram of a terminal according to an embodiment of the present disclosure.

Referring to FIG. 4, FIG. 4 is a first structural diagram of a terminal according to an embodiment of the present disclosure. As shown in FIG. 4, a terminal 400 includes:

a receiving module 401, configured to receive first information; and an establishment module 402, configured to establish, according to a first L2 configuration parameter of a first MBS, a bearer corresponding to the first MBS, where the first L2 configuration parameter is determined based on the first information.

In some embodiments, the first information is:

MBS configuration information; or first signaling, where the first signaling corresponds to the first MBS or an MBS of a first type, and the MBS of the first type includes the first MBS.

In some embodiments, in a case that the first information is the MBS configuration information, the first L2 configuration parameter meets any one of the following:

in a case that the first information does not carry an L2 configuration parameter, the first L2 configuration parameter is a default L2 configuration parameter; and in a case that the first information carries an L2 configuration parameter, the first L2 configuration parameter is determined according to at least the L2 configuration parameter carried in the first information.

In some embodiments, in a case that the first information is the first signaling, the first L2 configuration parameter meets any one of the following:

the first L2 configuration parameter is a default L2 configuration parameter in a first condition; and the first L2 configuration parameter is determined according to at least the first information in a second condition, where the first condition includes: the first information is signaling of a first type, or the first information is signaling of a first format; and the second condition includes: the first information is signaling of a second type, or the first information is signaling of a second format.

In some embodiments, the first information may be carried by using any one of the following: broadcast signaling, multicast signaling, unicast signaling, dedicated signaling, and system information.

In some embodiments, the first L2 configuration parameter is used to indicate at least one of the following:
whether a service data adaptation protocol SDAP entity presents on the bearer;
a parameter of the SDAP entity on the bearer;
whether a packet data convergence protocol PDCP entity presents on the bearer;
a parameter of the PDCP entity on the bearer;
a parameter of a radio link control RLC entity of the bearer; and
a parameter of a medium access control MAC entity of the bearer.

In some embodiments, the first information is used to indicate at least one of the following:
whether an SDAP entity presents on the bearer;
first characteristic information of the first MBS, where there is a correspondence between the first characteristic information and whether an SDAP entity presents on the bearer;
a parameter of the SDAP entity on the bearer;
first identifier information, where there is a correspondence between the first identifier information and the parameter of the SDAP entity on the bearer;
second characteristic information of the first MBS, where there is a correspondence between the second characteristic information and the parameter of the SDAP entity on the bearer;
whether a PDCP entity presents on the bearer;
third characteristic information of the first MBS, where there is a correspondence between the third characteristic information and whether a PDCP entity presents on the bearer;
a parameter of the PDCP entity on the bearer;
second identifier information, where there is a correspondence between the second identifier information and the parameter of the PDCP entity on the bearer;
fourth characteristic information of the first MBS, where there is a correspondence between the fourth characteristic information and the parameter of the PDCP entity on the bearer;
a parameter of a radio link control RLC entity of the bearer;
third identifier information, where there is a correspondence between the third identifier information and the parameter of the RLC entity of the bearer;
fifth characteristic information of the first MBS, where there is a correspondence between the fifth characteristic information and the parameter of the RLC entity of the bearer;
a parameter of a medium access control MAC entity;
fourth identifier information, where there is a correspondence between the fourth identifier information and the parameter of the MAC entity of the bearer; and
sixth characteristic information corresponding to the first MBS, where there is a correspondence between the sixth characteristic information and the parameter of the MAC entity of the bearer.

The terminal 400 can implement the processes implemented by the terminal in the method embodiment of the present disclosure. To avoid repetition, details are not described herein again.

Figure 5:
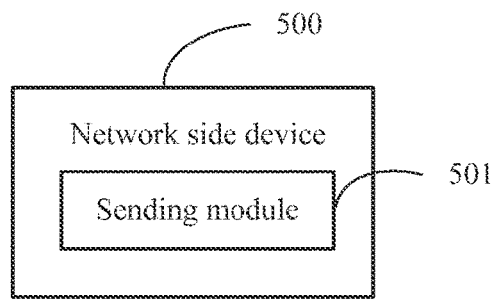
FIG. 5 is a first structural diagram of a network side device according to an embodiment of the present disclosure.

Referring to FIG. 5, FIG. 5 is a first structural diagram of a network side device according to an embodiment of the present disclosure. As shown in FIG. 5, a network side device 500 includes:

a sending module 501, configured to send first information, where the first information is used to determine a first L2 configuration parameter of a first MBS.

In some embodiments, the first information is:
MBS configuration information; or
first signaling, where the first signaling corresponds to the first MBS or an MBS of a first type, and the MBS of the first type includes the first MBS.

In some embodiments, in a case that the first information is the MBS configuration information, the first L2 configuration parameter meets any one of the following:
in a case that the first information does not carry an L2 configuration parameter, the first L2 configuration parameter is a default L2 configuration parameter; and
in a case that the first information carries an L2 configuration parameter, the first L2 configuration parameter is determined according to at least the L2 configuration parameter carried in the first information.

In some embodiments, in a case that the first information is the first signaling, the first L2 configuration parameter meets any one of the following:
the first L2 configuration parameter is a default L2 configuration parameter in a first condition; and
the first L2 configuration parameter is determined according to at least the first information in a second condition, where
the first condition includes: the first information is signaling of a first type, or the first information is signaling of a first format; and the second condition includes: the first information is signaling of a second type, or the first information is signaling of a second format.

In some embodiments, the first information may be carried by using any one of the following: broadcast signaling, multicast signaling, unicast signaling, dedicated signaling, and system information.

In some embodiments, the first L2 configuration parameter is used to indicate at least one of the following:
whether a service data adaptation protocol SDAP entity presents on the bearer;
a parameter of the SDAP entity on the bearer;
whether a packet data convergence protocol PDCP entity presents on the bearer;
a parameter of the PDCP entity on the bearer;
a parameter of a radio link control RLC entity of the bearer; and
a parameter of a medium access control MAC entity of the bearer.

In some embodiments, the first information is used to indicate at least one of the following:
whether an SDAP entity presents on the bearer;
first characteristic information of the first MBS, where there is a correspondence between the first characteristic information and whether an SDAP entity presents on the bearer;
a parameter of the SDAP entity on the bearer;
first identifier information, where there is a correspondence between the first identifier information and the parameter of the SDAP entity on the bearer;
second characteristic information of the first MBS, where there is a correspondence between the second characteristic information and the parameter of the SDAP entity on the bearer;
whether a PDCP entity presents on the bearer;
third characteristic information of the first MBS, where there is a correspondence between the third characteristic information and whether a PDCP entity presents on the bearer;

a parameter of the PDCP entity on the bearer;

second identifier information, where there is a correspondence between the second identifier information and the parameter of the PDCP entity on the bearer;

fourth characteristic information of the first MBS, where there is a correspondence between the fourth characteristic information and the parameter of the PDCP entity on the bearer;

a parameter of a radio link control RLC entity of the bearer;

third identifier information, where there is a correspondence between the third identifier information and the parameter of the RLC entity of the bearer;

fifth characteristic information of the first MBS, where there is a correspondence between the fifth characteristic information and the parameter of the RLC entity of the bearer;

a parameter of a medium access control MAC entity;

fourth identifier information, where there is a correspondence between the fourth identifier information and the parameter of the MAC entity of the bearer; and sixth characteristic information corresponding to the first MBS, where there is a correspondence between the sixth characteristic information and the parameter of the MAC entity of the bearer.

The network side device 500 can implement the processes implemented by the network side device in the method embodiment of the present disclosure. To avoid repetition, details are not described herein again.

Figure 6:
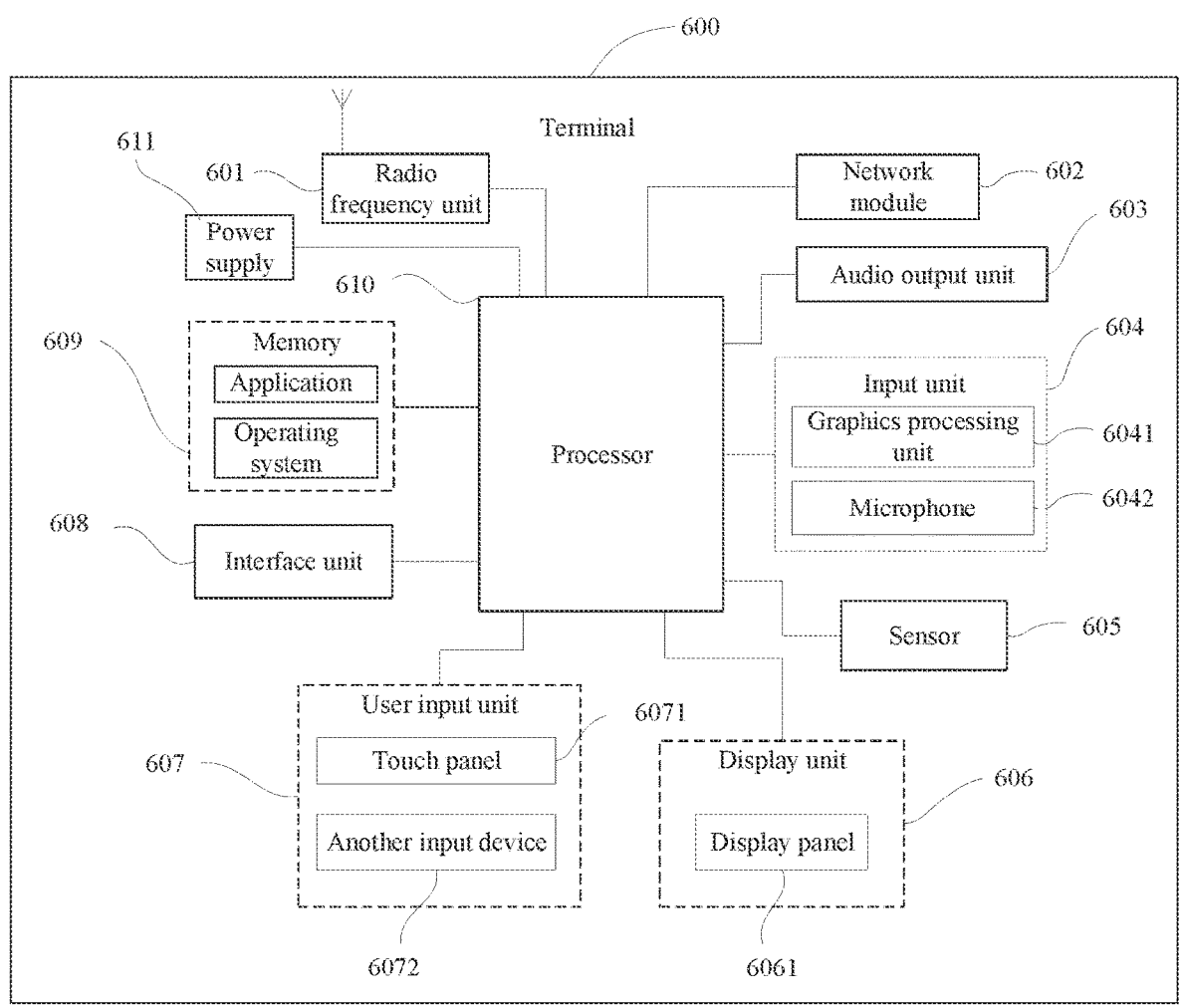
FIG. 6 is a second structural diagram of a terminal according to an embodiment of the present disclosure.

Referring to FIG. 6, FIG. 6 is a second structural diagram of a terminal according to an embodiment of the present disclosure. The terminal may be a schematic diagram of a hardware structure of a terminal that implements the embodiments of the present disclosure. As shown in FIG. 6, a terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 601 is configured to:

receive first information; and the processor 610 is configured to:

establish, according to a first layer 2 L2 configuration parameter of a first multicast/broadcast service MBS, a bearer corresponding to the first MBS, where the first L2 configuration parameter is determined based on the first information.

In some embodiments, the first information is:

MBS configuration information; or first signaling, where the first signaling corresponds to the first MBS or an MBS of a first type, and the MBS of the first type includes the first MBS.

In some embodiments, in a case that the first information is the MBS configuration information, the first L2 configuration parameter meets any one of the following:

in a case that the first information does not carry an L2 configuration parameter, the first L2 configuration parameter is a default L2 configuration parameter; and in a case that the first information carries an L2 configuration parameter, the first L2 configuration parameter is determined according to at least the L2 configuration parameter carried in the first information.

In some embodiments, in a case that the first information is the first signaling, the first L2 configuration parameter meets any one of the following:

the first L2 configuration parameter is a default L2 configuration parameter in a first condition; and the first L2 configuration parameter is determined according to at least the first information in a second condition, where the first condition includes: the first information is signaling of a first type, or the first information is signaling of a first format; and the second condition includes: the first information is signaling of a second type, or the first information is signaling of a second format.

In some embodiments, the first information may be carried by using any one of the following: broadcast signaling, multicast signaling, unicast signaling, dedicated signaling, and system information.

In some embodiments, the first L2 configuration parameter is used to indicate at least one of the following:

whether a service data adaptation protocol SDAP entity presents on the bearer;

a parameter of the SDAP entity on the bearer;

whether a packet data convergence protocol PDCP entity presents on the bearer;

a parameter of the PDCP entity on the bearer;

a parameter of a radio link control RLC entity of the bearer; and a parameter of a medium access control MAC entity of the bearer.

In some embodiments, the first information is used to indicate at least one of the following:

whether an SDAP entity presents on the bearer;

first characteristic information of the first MBS, where there is a correspondence between the first characteristic information and whether an SDAP entity presents on the bearer;

a parameter of the SDAP entity on the bearer;

first identifier information, where there is a correspondence between the first identifier information and the parameter of the SDAP entity on the bearer;

second characteristic information of the first MBS, where there is a correspondence between the second characteristic information and the parameter of the SDAP entity on the bearer;

whether a PDCP entity presents on the bearer;

third characteristic information of the first MBS, where there is a correspondence between the third characteristic information and whether a PDCP entity presents on the bearer;

a parameter of the PDCP entity on the bearer;

second identifier information, where there is a correspondence between the second identifier information and the parameter of the PDCP entity on the bearer;

fourth characteristic information of the first MBS, where there is a correspondence between the fourth characteristic information and the parameter of the PDCP entity on the bearer;

a parameter of a radio link control RLC entity of the bearer;

third identifier information, where there is a correspondence between the third identifier information and the parameter of the RLC entity of the bearer;

fifth characteristic information of the first MBS, where there is a correspondence between the fifth characteristic information and the parameter of the RLC entity of the bearer;

a parameter of a medium access control MAC entity;

fourth identifier information, where there is a correspondence between the fourth identifier information and the parameter of the MAC entity of the bearer; and sixth characteristic information corresponding to the first MBS, where there is a correspondence between the sixth characteristic information and the parameter of the MAC entity of the bearer.

It should be noted that in this embodiment, the foregoing terminal 600 can implement the processes in the method embodiment in the embodiments of the present disclosure. To avoid repetition, details are not described herein again.

It should be understood that, in this embodiment of the present disclosure, the radio frequency unit 601 may be configured to receive and send information or a signal in a call process. For example, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may communicate with a network and another device through a wireless communication system.

The terminal provides wireless broadband Internet access for the user by using the network module 602, for example, helping the user to send and receive an e-mail, brows a web page, and access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal received voice, or a message received voice) related to a function implemented by the terminal 600. The audio output unit 603 includes a speaker, a buzzer, a telephone receiver, and the like.

The input unit 604 is configured to receive an audio signal or a video signal. The input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. Processed audio data may be converted, in a call mode, into a format that can be sent to a mobile communication base station by using the radio frequency unit 601 for output.

The terminal 600 further includes at least one type of sensor 605, such as a light sensor, a motion sensor, and another sensor. For example, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal 600 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include a display panel 6061. The display panel 6061 may be configured in a form of a Liquid Crystal Display (LCD), an Organic Light-Emitting Diode (OLED), or the like.

The user input unit 607 may be configured to receive input numeral or character information, and generate key signal input related to user setting and functional control of the terminal. For example, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 610, and receives and executes a command sent by the processor 610. In addition, the touch panel 6071 may be of a resistive type, a capacitive type, an infrared type, a surface acoustic wave type, or the like. The user input unit 607 may include another input device 6072 in addition to the touch panel 6071. For example, the another input device 6072 may include but is not limited to a physical keyboard, a functional button (such as a volume control button or a power on/off button), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, although the touch panel 6071 and the display panel 6061 are used as two independent parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus with the terminal 600. For example, the external apparatus may include a wired or wireless headphone port, an external power supply (or a battery charger)

port, a wired or wireless data port, a storage card port, a port used to connect to an apparatus having an identity module, an audio input/output (I/O) port, a video I/O port, a headset port, and the like. The interface unit 608 may be configured to receive input (for example, data information and power) from an external apparatus and transmit the received input to one or more elements in the terminal 600 or may be configured to transmit data between the terminal 600 and an external apparatus.

The memory 609 may be configured to store a software program and various data. The memory 609 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal, and connects all parts of the entire terminal by using various interfaces and lines. By running or executing a software program and/or a module stored in the memory 609 and invoking data stored in the memory 609, the processor 610 performs various functions of the terminal and data processing, to perform overall monitoring on the terminal. The processor 610 may include one or more processing units. For example, an application processor and a modem processor may be integrated into the processor 610. The application processor mainly processes an operating system, a user interface, an application, and the like. The modem processor mainly processes wireless communications. It can be understood that, alternatively, the modem processor may not be integrated into the processor 610.

The terminal 600 may further include the power supply 611 (such as a battery) that supplies power to each component. For example, the power supply 611 may be logically connected to the processor 610 by using a power management system, so as to implement functions such as charging, discharging, and power consumption management by using the power management system.

In addition, the terminal 600 includes some function modules not shown, and details are not described herein.

For example, an embodiment of the present disclosure further provides a terminal, including a processor 610, a memory 609, and a computer program that is stored in the memory 609 and that can be run on the processor 610. When the computer program is executed by the processor 610, the processes of the foregoing bearer establishment method embodiment are implemented and the same technical effect can be achieved. To avoid repetition, details are not described herein again.

Figure 7:
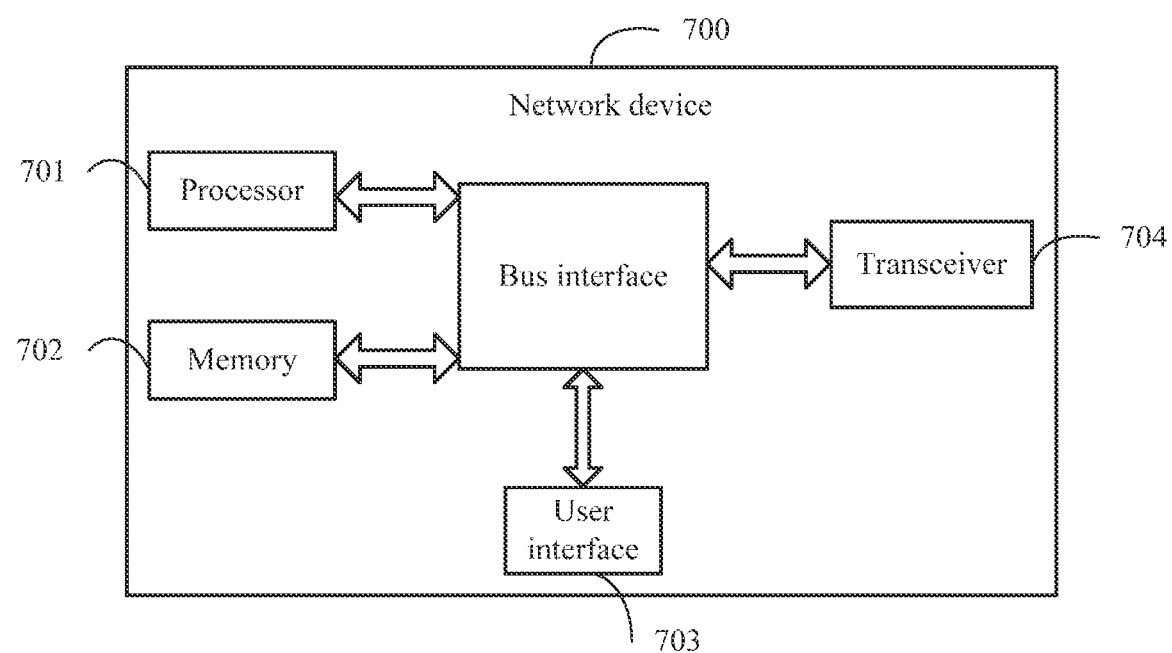
FIG. 7 is a second structural diagram of a network side device according to an embodiment of the present disclosure.

Referring to FIG. 7, FIG. 7 is a second structural diagram of a network side device according to an embodiment of the present disclosure. As shown in FIG. 7, a network side device 700 includes a processor 701, a memory 702, a user interface 703, a transceiver 704, and a bus interface.

In this embodiment of the present disclosure, the network side device 700 further includes a computer program that is stored in the memory 702 and that can be run on the processor 701, and when the computer program is executed by the processor 701, the following step is implemented:

sending first information by using the transceiver 704, where the first information is used to determine a first L2 configuration parameter of a first MBS.

In some embodiments, the first information is:
MBS configuration information; or first signaling, where the first signaling corresponds to the first MBS or an MBS of a first type, and the MBS of the first type includes the first MBS.

In some embodiments, in a case that the first information is the MBS configuration information, the first L2 configuration parameter meets any one of the following:
in a case that the first information does not carry an L2 configuration parameter, the first L2 configuration parameter is a default L2 configuration parameter; and
in a case that the first information carries an L2 configuration parameter, the first L2 configuration parameter is determined according to at least the L2 configuration parameter carried in the first information.

In some embodiments, in a case that the first information is the first signaling, the first L2 configuration parameter meets any one of the following:
the first L2 configuration parameter is a default L2 configuration parameter in a first condition; and
the first L2 configuration parameter is determined according to at least the first information in a second condition, where
the first condition includes: the first information is signaling of a first type, or the first information is signaling of a first format; and the second condition includes: the first information is signaling of a second type, or the first information is signaling of a second format.

In some embodiments, the first information may be carried by using any one of the following: broadcast signaling, multicast signaling, unicast signaling, dedicated signaling, and system information.

In some embodiments, the first L2 configuration parameter is used to indicate at least one of the following:
whether a service data adaptation protocol SDAP entity presents on the bearer;
a parameter of the SDAP entity on the bearer;
whether a packet data convergence protocol PDCP entity presents on the bearer;
a parameter of the PDCP entity on the bearer;
a parameter of a radio link control RLC entity of the bearer; and
a parameter of a medium access control MAC entity of the bearer.

In some embodiments, the first information is used to indicate at least one of the following:
whether an SDAP entity presents on the bearer;
first characteristic information of the first MBS, where there is a correspondence between the first characteristic information and whether an SDAP entity presents on the bearer;
a parameter of the SDAP entity on the bearer;
first identifier information, where there is a correspondence between the first identifier information and the parameter of the SDAP entity on the bearer;
second characteristic information of the first MBS, where there is a correspondence between the second characteristic information and the parameter of the SDAP entity on the bearer;
whether a PDCP entity presents on the bearer;
third characteristic information of the first MBS, where there is a correspondence between the third characteristic information and whether a PDCP entity presents on the bearer;

a parameter of the PDCP entity on the bearer;
second identifier information, where there is a correspondence between the second identifier information and the parameter of the PDCP entity on the bearer;
fourth characteristic information of the first MBS, where there is a correspondence between the fourth characteristic information and the parameter of the PDCP entity on the bearer;
a parameter of a radio link control RLC entity of the bearer;
third identifier information, where there is a correspondence between the third identifier information and the parameter of the RLC entity of the bearer;
fifth characteristic information of the first MBS, where there is a correspondence between the fifth characteristic information and the parameter of the RLC entity of the bearer;
a parameter of a medium access control MAC entity;
fourth identifier information, where there is a correspondence between the fourth identifier information and the parameter of the MAC entity of the bearer; and
sixth characteristic information corresponding to the first MBS, where there is a correspondence between the sixth characteristic information and the parameter of the MAC entity of the bearer.

In FIG. 7, a bus architecture may include any quantity of interconnected buses and bridges. For example, various circuits of one or more processors represented by the processor 701 and a memory represented by the memory 702 are interconnected. The bus architecture may further link various other circuits such as a peripheral device, a voltage regulator, and a power management circuit. These are well known in the art, and therefore are not further described in this specification. A bus interface provides an interface. The transceiver 704 may be a plurality of components. For example, the transceiver 704 includes a transmitter and a receiver, and provides a unit configured to communicate with various other apparatuses on a transmission medium. For different user equipment, the user interface 703 may further be an interface that can be externally or internally connected to a device, and the connected device includes but is not limited to a keypad, a display, a loudspeaker, a microphone, or a joystick.

The processor 701 is responsible for bus architecture management and general processing. The memory 702 may store data used by the processor 701 when the processor 701 performs an operation.

The network side device 700 can implement the processes implemented by the network side device in the foregoing method embodiment. To avoid repetition, details are not described herein again.

An embodiment of the present disclosure further provides a computer-readable storage medium. The computer-readable storage medium stores a computer program, and when the computer program is executed by a processor, the processes of the foregoing bearer establishment method embodiment or configuration method embodiment are implemented, and the same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above exemplary implementations, and the above exemplary implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A bearer establishment method, performed by a terminal, the method comprising:
receiving first information, wherein the first information carries a part of configuration parameters of a Layer 2 (L2) configuration parameter; and
establishing, according to a first L2 configuration parameter of a first Multicast Broadcast Service (MBS), a bearer corresponding to the first MBS, wherein the first L2 configuration parameter is determined based on the part of configuration parameters of the L2 configuration parameter carried in the first information and a default L2 configuration parameter,
wherein the first L2 configuration parameter is used to indicate at least one of the following:
a parameter of a Packet Data Convergence Protocol (PDCP) entity on the bearer, wherein the parameter of the PDCP entity comprises at least one of the following: a header compression configuration, a security configuration, a reordering timer configuration, or a PDCP Sequence Number (SN) size; or
a parameter of a Radio Link Control (RLC) entity of the bearer, wherein the parameter of the RLC entity comprises at least one of the following: an RLC transmission mode, an RLC SN length, a reassembly timer length, or a related parameter of an AM status feedback.

2. The bearer establishment method according to claim 1, wherein the first information is:
MBS configuration information; or
first signaling, wherein the first signaling corresponds to the first MBS or an MBS of a first type, and the MBS of the first type comprises the first MBS.

3. The bearer establishment method according to claim 2, wherein when the first information is the first signaling,
  the first L2 configuration parameter is determined according to at least the first information in a condition, wherein:
    the condition comprises: the first information is signaling of a second type, or the first information is signaling of a second format.

4. The bearer establishment method according to claim 1, wherein the first information may be carried by using any one of the following: broadcast signaling, multicast signaling, unicast signaling, dedicated signaling, or system information.

5. The bearer establishment method according to claim 1, wherein the first L2 configuration parameter is further used to indicate at least one of the following:
  whether a Service Data Adaptation Protocol (SDAP) entity presents on the bearer;
  a parameter of the SDAP entity on the bearer;
  whether the PDCP entity presents on the bearer; or
  a parameter of a Medium Access Control (MAC) entity of the bearer.

6. The bearer establishment method according to claim 5, wherein the first information is used to indicate at least one of the following:
  whether an SDAP entity presents on the bearer;
  first characteristic information of the first MBS, wherein there is a correspondence between the first characteristic information and whether an SDAP entity presents on the bearer;
  a parameter of the SDAP entity on the bearer;
  first identifier information, wherein there is a correspondence between the first identifier information and the parameter of the SDAP entity on the bearer;
  second characteristic information of the first MBS, wherein there is a correspondence between the second characteristic information and the parameter of the SDAP entity on the bearer;
  whether a PDCP entity presents on the bearer;
  third characteristic information of the first MBS, wherein there is a correspondence between the third characteristic information and whether a PDCP entity presents on the bearer;
  a parameter of the PDCP entity on the bearer;
  second identifier information, wherein there is a correspondence between the second identifier information and the parameter of the PDCP entity on the bearer;
  fourth characteristic information of the first MBS, wherein there is a correspondence between the fourth characteristic information and the parameter of the PDCP entity on the bearer;
  a parameter of a RLC entity of the bearer;
  third identifier information, wherein there is a correspondence between the third identifier information and the parameter of the RLC entity of the bearer;
  fifth characteristic information of the first MBS, wherein there is a correspondence between the fifth characteristic information and the parameter of the RLC entity of the bearer;
  a parameter of an MAC entity;
  fourth identifier information, wherein there is a correspondence between the fourth identifier information and the parameter of the MAC entity of the bearer; or
  sixth characteristic information corresponding to the first MBS, wherein there is a correspondence between the sixth characteristic information and the parameter of the MAC entity of the bearer.

7. A configuration method, performed by a network side device, the method comprising:
  sending first information, wherein the first information carries a part of configuration parameters of a Layer 2 (L2) configuration parameter,
  wherein the first information is used to determine a first L2 configuration parameter of a first Multicast Broadcast Service (MBS),
  wherein the first L2 configuration parameter is determined based on the part of configuration parameters of the L2 configuration parameter carried in the first information and a default L2 configuration parameter,
  wherein the first L2 configuration parameter is used to indicate at least one of the following:
    a parameter of a Packet Data Convergence Protocol (PDCP) entity on the bearer, wherein the parameter of the PDCP entity comprises at least one of the following: a header compression configuration, a security configuration, a reordering timer configuration, or a PDCP Sequence Number (SN) size; or
    a parameter of a Radio Link Control (RLC) entity of the bearer, wherein the parameter of the RLC entity comprises at least one of the following: an RLC transmission mode, an RLC SN length, a reassembly timer length, or a related parameter of an AM status feedback.

8. The configuration method according to claim 7, wherein the first information is:
  MBS configuration information; or
  first signaling, wherein the first signaling corresponds to the first MBS or an MBS of a first type, and the MBS of the first type comprises the first MBS.

9. The configuration method according to claim 8, wherein when the first information is the first signaling,
  the first L2 configuration parameter is determined according to at least the first information in a condition, wherein:
    the condition comprises: the first information is signaling of a second type, or the first information is signaling of a second format.

10. The configuration method according to claim 7, wherein the first information may be carried by using any one of the following: broadcast signaling, multicast signaling, unicast signaling, dedicated signaling, or system information.

11. The configuration method according to claim 7, wherein the first L2 configuration parameter is further used to indicate at least one of the following:
  whether a Service Data Adaptation Protocol (SDAP) entity presents on the bearer;
  a parameter of the SDAP entity on the bearer;
  whether the PDCP entity presents on the bearer; or
  a parameter of a Medium Access Control (MAC) entity of the bearer.

12. The configuration method according to claim 7, wherein the first information is used to indicate at least one of the following:
  whether an SDAP entity presents on the bearer;
  first characteristic information of the first MBS, wherein there is a correspondence between the first characteristic information and whether an SDAP entity presents on the bearer;

a parameter of the SDAP entity on the bearer;

first identifier information, wherein there is a correspondence between the first identifier information and the parameter of the SDAP entity on the bearer;

second characteristic information of the first MBS, wherein there is a correspondence between the second characteristic information and the parameter of the SDAP entity on the bearer;

whether a PDCP entity presents on the bearer;

third characteristic information of the first MBS, wherein there is a correspondence between the third characteristic information and whether a PDCP entity presents on the bearer;

a parameter of the PDCP entity on the bearer;

second identifier information, wherein there is a correspondence between the second identifier information and the parameter of the PDCP entity on the bearer;

fourth characteristic information of the first MBS, wherein there is a correspondence between the fourth characteristic information and the parameter of the PDCP entity on the bearer;

a parameter of a RLC entity of the bearer;

third identifier information, wherein there is a correspondence between the third identifier information and the parameter of the RLC entity of the bearer;

fifth characteristic information of the first MBS, wherein there is a correspondence between the fifth characteristic information and the parameter of the RLC entity of the bearer;

a parameter of an MAC entity;

fourth identifier information, wherein there is a correspondence between the fourth identifier information and the parameter of the MAC entity of the bearer; or sixth characteristic information corresponding to the first MBS, wherein there is a correspondence between the sixth characteristic information and the parameter of the MAC entity of the bearer.

13. A terminal, comprising a processor, a memory, and a computer program that is stored in the memory and that can be run on the processor, wherein the computer program, when executed by the processor, causes the processor to perform a bearer establishment method, the method comprising:

receiving first information, wherein the first information carries a part of configuration parameters of a Layer 2 (L2) configuration parameter; and establishing, according to a first L2 configuration parameter of a first Multicast Broadcast Service (MBS), a bearer corresponding to the first MBS, wherein the first L2 configuration parameter is determined based on the part of configuration parameters of the L2 configuration parameter carried in the first information and a default L2 configuration parameter, wherein the first L2 configuration parameter is used to indicate at least one of the following:

a parameter of a Packet Data Convergence Protocol (PDCP) entity on the bearer, wherein the parameter of the PDCP entity comprises at least one of the following: a header compression configuration, a security configuration, a reordering timer configuration, or a PDCP Sequence Number (SN) size; or a parameter of a Radio Link Control (RLC) entity of the bearer, wherein the parameter of the RLC entity comprises at least one of the following: an RLC transmission mode, an RLC SN length, a reassembly timer length, or a related parameter of an AM status feedback.

14. The terminal according to claim 13, wherein the first information is:

MBS configuration information; or first signaling, wherein the first signaling corresponds to the first MBS or an MBS of a first type, and the MBS of the first type comprises the first MBS.

15. The terminal according to claim 14, wherein when the first information is the first signaling, the first L2 configuration parameter is determined according to at least the first information in a condition, wherein:

the condition comprises: the first information is signaling of a second type, or the first information is signaling of a second format.

16. The terminal according to claim 13, wherein the first information may be carried by using any one of the following: broadcast signaling, multicast signaling, unicast signaling, dedicated signaling, or system information.

17. The terminal according to claim 13, wherein the first L2 configuration parameter is further used to indicate at least one of the following:

whether a Service Data Adaptation Protocol (SDAP) entity presents on the bearer;

a parameter of the SDAP entity on the bearer;

whether the PDCP entity presents on the bearer; or a parameter of a Medium Access Control (MAC) entity of the bearer.

* * * * *